Figure 1:
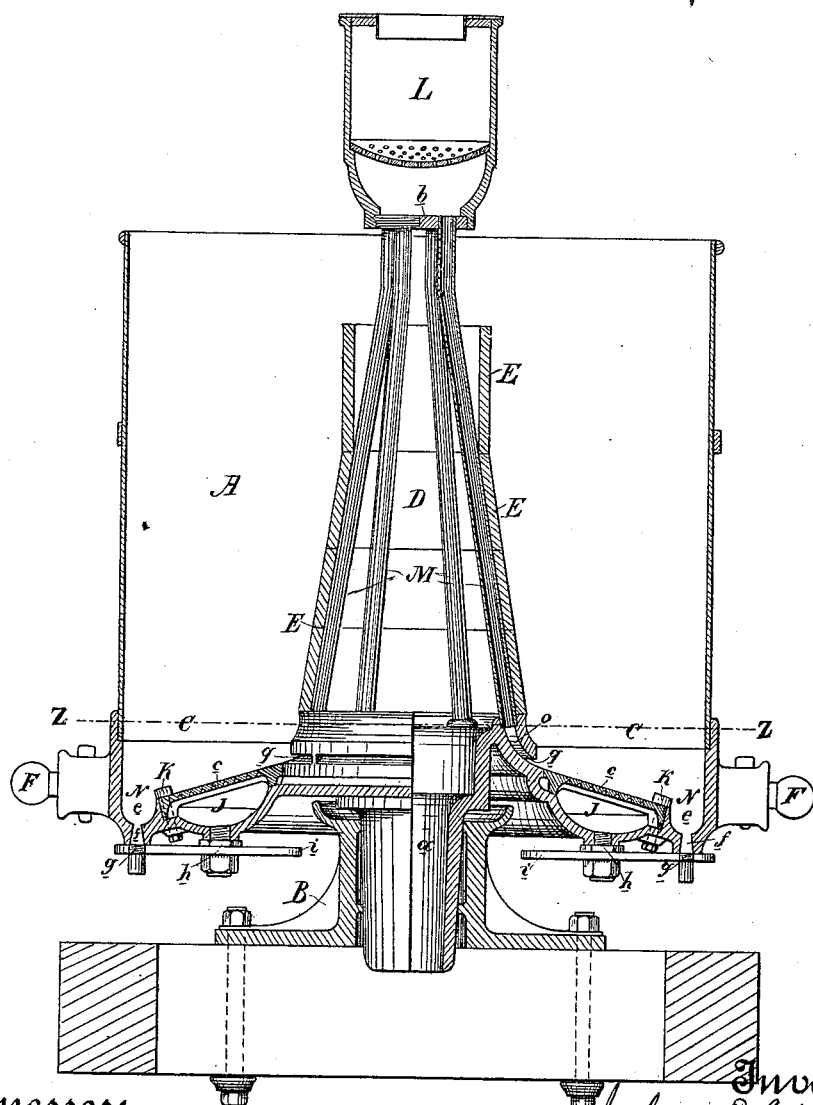

(No Model.) 4 Sheets—Sheet 1.

J. E. CLAYTON & S. F. MACKIE.
CONCENTRATOR.

No. 344,520. Patented June 29, 1886.

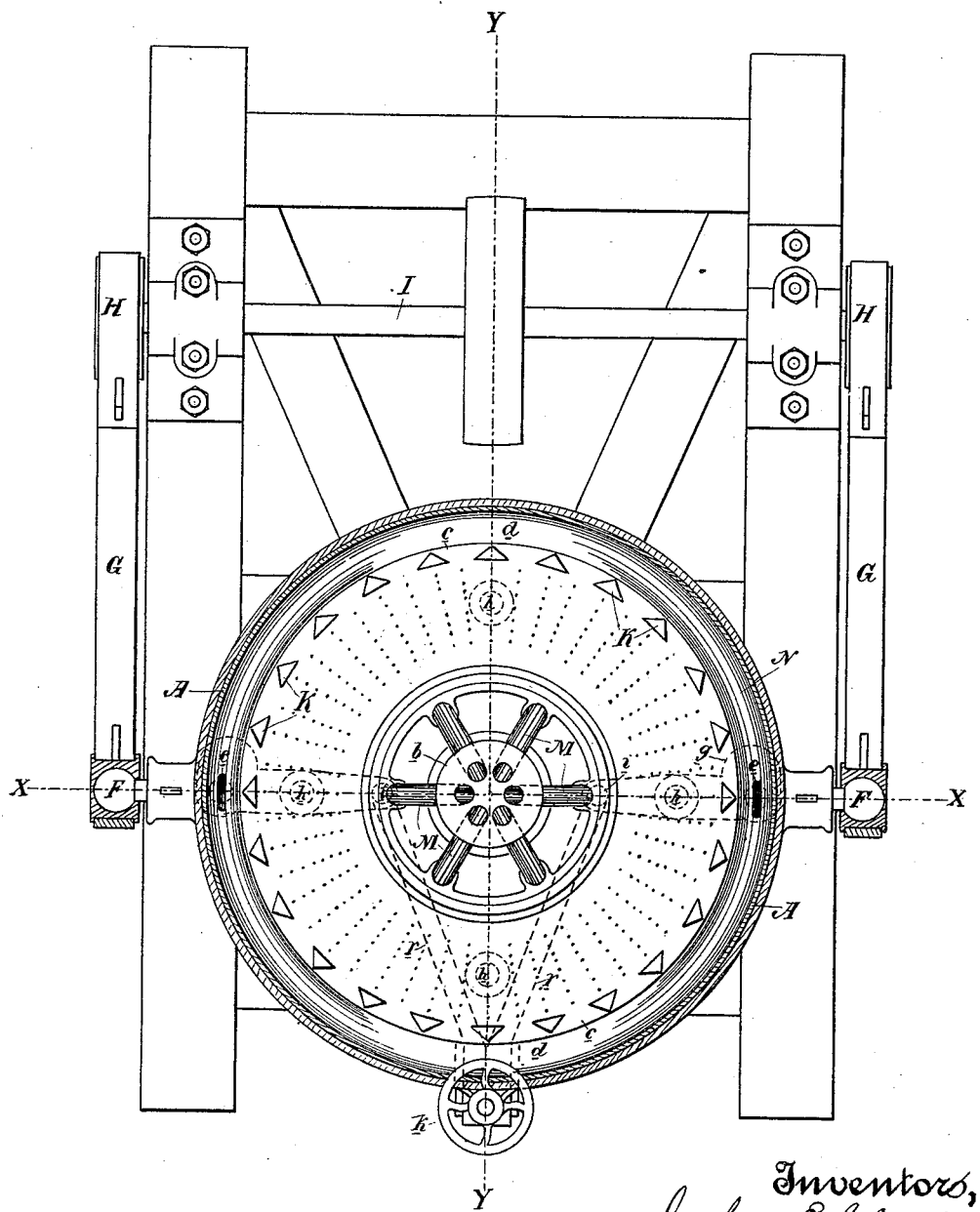

(No Model.) 4 Sheets—Sheet 3.
J. E. CLAYTON & S. F. MACKIE.
CONCENTRATOR.
No. 344,520. Patented June 29, 1886.
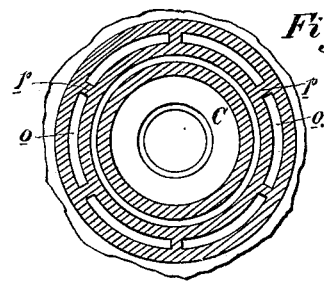
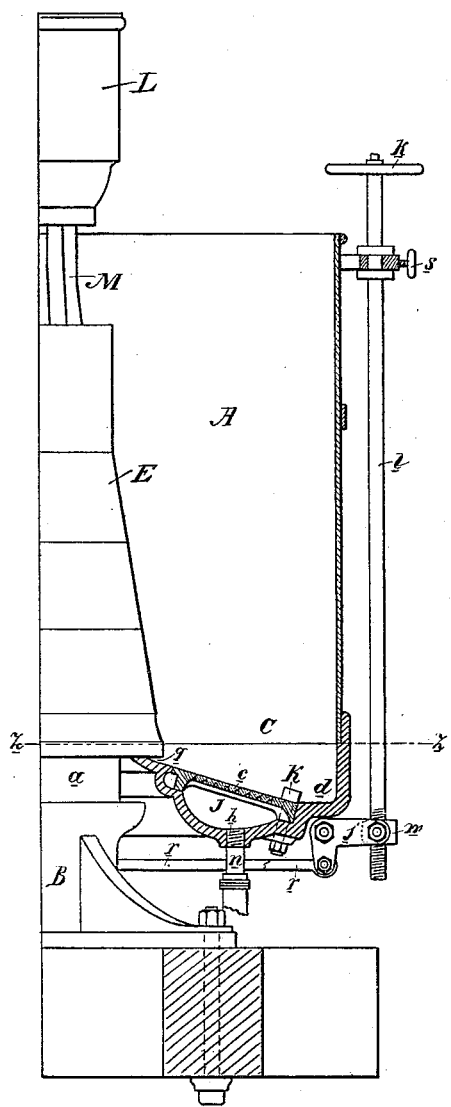
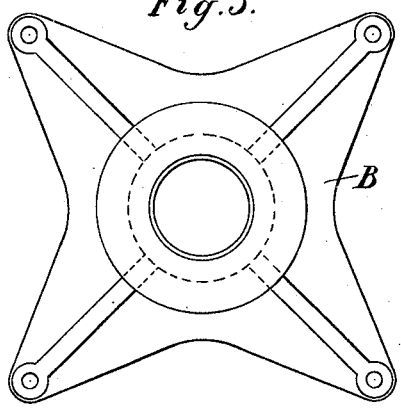
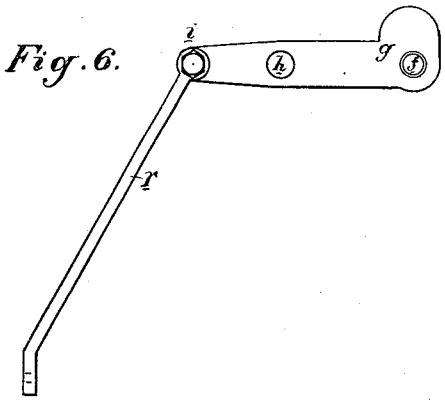
Witnesses,
Geo. H. Strong.
Inventors,
Joshua E. Clayton
Simon F. Mackie
By Dewey & Co.
attys (No Model.) 4 Sheets—Sheet 4.
J. E. CLAYTON & S. F. MACKIE.
CONCENTRATOR.
No. 344,520. Patented June 29, 1886.
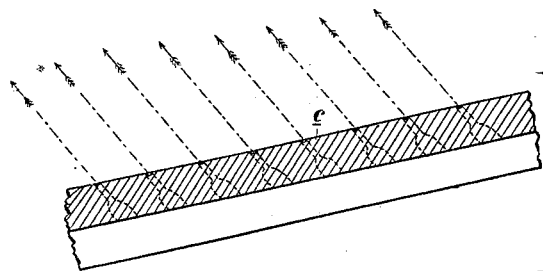
*Fig. 7.*
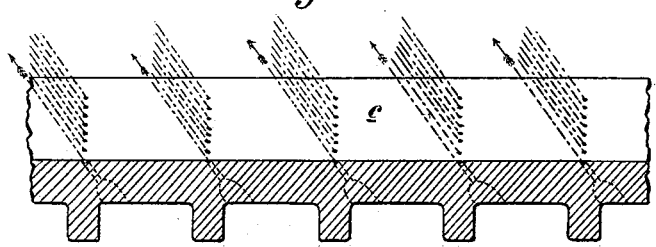
*Fig. 8.*
*Fig. 10.*
*Fig. 9.*
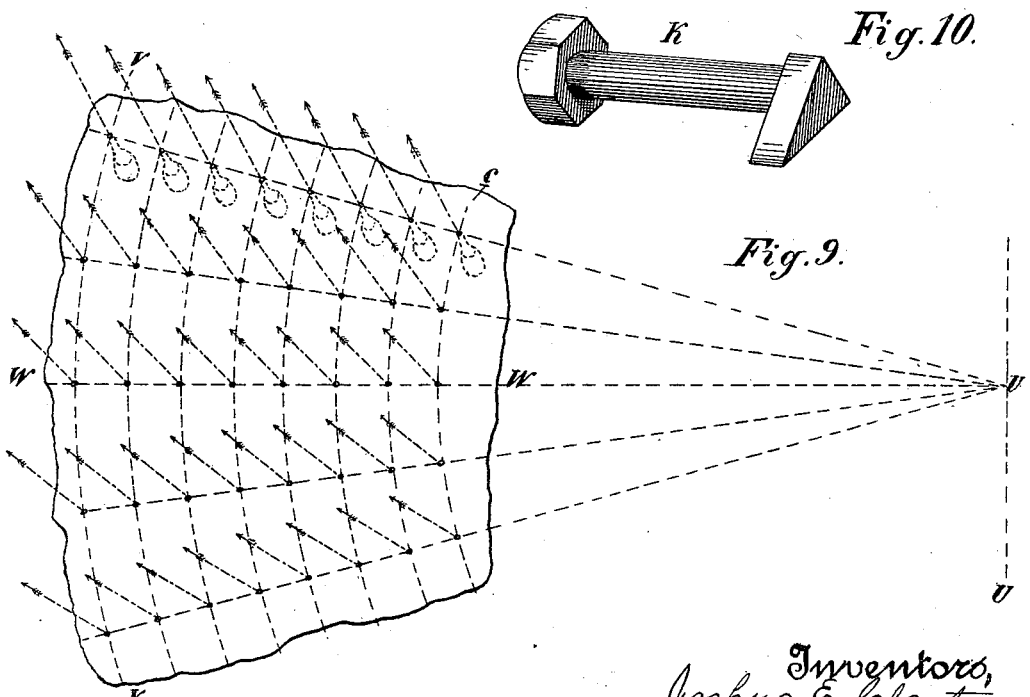
Witnesses:
Geo. H. Strong.
Inventors,
Joshua E. Clayton
Simon F. Mackie
By Dewey & Co.
Attorneys

UNITED STATES PATENT OFFICE.

JOSHUA E. CLAYTON AND SIMON F. MACKIE, OF SALT LAKE CITY, UTAH TERRITORY.

CONCENTRATOR.

SPECIFICATION forming part of Letters Patent No. 344,520, dated June 29, 1886.

Application filed October 15, 1885. Serial No. 180,022. (No model.)

*To all whom it may concern:*

Be it known that we, JOSHUA E. CLAYTON and SIMON F. MACKIE, both of Salt Lake City, county of Salt Lake, and Territory of Utah, have invented an Improvement in Concentrators; and we hereby declare the following to be a full, clear, and exact description thereof.

Our invention relates to improvements in machines for concentrating ores, slimes, tailings, sulphurets, or other substances in which it is desired to separate the heavier from the lighter portions.

It consists of certain mechanism, which will be claimed, and more fully explained by reference to the accompanying drawings, in which—

Figure 1 is a vertical section of the machine, taken on the line X X, Fig. 2. In this figure the connecting-rods, &c., are not shown, to avoid confusion. Fig. 2 is a plan of the machine, the rings and upper part of hopper being removed. Fig. 3 is another vertical half-section taken on the line Y Y, Fig. 2. Fig. 4 is a horizontal section of the central portion of the bottom, on the line Z Z, Figs. 1 and 3. Fig. 5 is a plan of the base on which the machine rests. Fig. 6 is a plan of the gate for closing the heading or concentrate discharge, and attached connecting-rod. Fig. 7 is an enlarged vertical section in a radial direction of the perforated cover, taken on the line W W, Fig. 9. Fig. 8 is a vertical section of the same, taken on the line V V, Fig. 9. Fig. 9 is an enlarged partial plan of the cover. Fig. 10 is a perspective view of the bolts for holding the cover in place.

A is the pan or tub, which we have shown as a vertical cylinder having a bottom, C, the two being riveted together at their junction. The bottom C has cast in it the central open pipe or spindle, $a$, which passes down through the base B, forming a step journal or bearing, upon which the whole upper portions of the machine can revolve freely. The bottom C, outside of the central opening just mentioned, has an annular depression cast in it, which is covered by a perforated cover, $c$, which forms an annular water space or chamber, J. When working, water is supplied to this space by the short tubes $n$, to which are secured flexible hose, so as not to prevent the vibration or oscillation of the pan or tub.

From the central portion of the bottom C rises the cone D. This consists of six pipes or tubes, M, which are at their feet secured into the bottom C and at their heads into the plate $b$. These tubes we prefer to bend slightly in their upper portions, as shown in the drawings, for convenience of construction. The plate $b$ supports and forms the bottom of the hopper L. The lower ends of the tubes M open into the series of chambers shown in the section of the bottom C in Fig. 4. Here there are six chambers, $o$, arranged in an annular ring, which is divided into parts by the partitions $p$, and which communicate with the working-chamber of the machine by the slits $q$, which discharge upon or very slightly above the perforated cover $c$.

Around the periphery of the perforated cover $c$ runs an annular gutter, N. This gutter is flat or nothing at the points $d$, and thence gradually deepens to the points $e$, so that a circular section of the bottom through the center of this gutter would have the form of two flat V's or a flat W.

At the points $e$ are the discharge-openings for the headings or concentrates, terminating in the short pipes $f$, closable by the gates $g$. These gates pivot at $h$, and their inner ends, $i$, are attached to the rods $r$, which are operated by the bell-crank lever $j$, hand-wheel $k$, spindle $l$, nut $m$, and clamp-screw $s$, and by turning the hand-wheel $k$ both of the discharge-openings are opened or closed uniformly and simultaneously.

On the bottom C are cast four bosses, $h$, in which are threaded holes. Into two of these are screwed plugs, which serve as the supports on which the gates $g$ turn, while into the other two are screwed the nipples $n$, to which are secured lengths of flexible hose, which serve for the supply of water to the annular water-space J.

The perforated cover $c$ is attached to the bottom C by the bolts K, whose form is shown in Fig. 10.

At opposite points on the bottom C are pins

F, which are taken hold of by the stub ends of two connecting-rods, G, which are worked by the two eccentrics H, keyed onto the shaft I at one hundred and eighty degrees apart, and when the shaft I is set in rotation a circular vibratory or oscillating motion is set up in the whole of the machine, save the base B.

The machine is operated as follows: Water at suitable pressure is let into the annular water-space J, and passes from thence through the perforated cover c in jets, and the space above the cover is soon filled with water, which overflows over the rings E and out through the pipe a. This mass of water has a rotation around the axis of the machine, and the height of the discharge is regulated by putting on or taking off the rings E until best suited to the material to be operated upon. The machine being filled with water, stock, pulp, or the material to be treated, mixed with water until it possesses a suitable dilution, is introduced into the hopper L, and flows down through the pipes M, and out upon the perforated cover c through the slits q. There it meets the upward and rotating current produced by the jets, and the lighter portion or tailings flow out over the rings E, and through the discharge-pipe a. The heavier portion (the headings or concentrates) remains upon the cover c. These headings are worked outward by the conical form of the bottom, the rotation of the mass of water, and the vibratory or oscillating action of the machine, and collect in the gutter N, down which they work to the discharge-openings e. When a sufficient depth of concentrates has accumulated on the bottom, the hand-wheel k is turned, and the gates g are opened until the headings or concentrates are discharged as fast as they are dressed or cleaned up. The proper régime of the machine being established, the working is continuous.

There are some special portions of this machine which may now with advantage be described more minutely. One of these is the perforated cover c. The perforations in this cover allow jets of water to pass from the water-space J into the body of the machine. The nature and position of these perforations will appear by reference to Figs. 7, 8, and 9; but it is a somewhat difficult matter to precisely describe in words the direction of the axes of the water-jets issuing from this perforated bottom. There are several alternative methods of describing this direction. One of these is as follows: Let Fig. 7 represent a portion of a section of the cover c, made by a plane passing through the axis of the whole machine. Then the projections of the axes of the jets shown by the lines dotted thus —.—.— in this figure make an acute angle with the projection of the axis of the machine U U upon this plane, and the direction of the jets is, when projected on this plane, as shown by the arrows, upward and outward.

Fig. 8 represents a section of the perforated cover c, made by a right cylindrical plane perpendicular to the plane of the section in Fig. 7, whose axis is the axis of the machine.

In Fig. 9 the axes of jets are shown by the lines dotted thus —.—.—, and this figure shows the projection of said axes upon a plane perpendicular to the axis of the whole machine, made by planes drawn perpendicular to said plane of section and passing through the axes of said jets.

It will be apparent to skilled mechanics who may examine the foregoing figures that the perforations for the jets, as shown, are so arranged as to produce not only an upward and outward current of water, but to cause the whole body of water lying above the cover to rotate around the axis of the machine—in other words, to move upward in spiral lines. This construction enables us to dispense with any arrangement for stirring or setting the mass of water in rotation, and by this construction we use not only the upward and outward currents induced by the jets as a means of separation, but also employ the centrifugal force generated by the rotation induced by the direction of the jets.

We would also call attention to the fact that the effect of the combination of the rotation of the water, &c., produced by the action of the jets and the oscillatory or vibratory motion imparted to the whole machine, and through it to the holes, whence the jets arise, is to cause a pulsation or variation in the force of these jets analogous to the action of water in jigging, and that the period of these pulsations and the nature of the effects produced can be varied by adjusting the throw of the eccentrics and the speed of the shaft.

The form of the heads of the bolts K, which secure the perforated cover c to the bottom C of the machine, is shown in Fig. 10, and from an examination of the drawings it is apparent that when the machine is in operation and the cover c covered with headings or concentrates the vibration of the machine, when coupled with the form of these bolt-heads, will tend to force the headings or concentrates into the gutter N.

Having thus described our invention, what we claim as new, and desire to secure by Letters Patent, is—

1. A concentrator having a perforated bottom, cover, or diaphragm, through which jets of water are discharged upward, a chamber below the same, to which water under pressure is admitted, a central discharge for tailings, and the central cone, D, composed of the hopper L, pipes M, and the discharge-slits q, substantially as and for the purposes herein described.

2. A concentrator having an oscillating or vibrating motion, as herein described, an annular water chamber or space, J, filled with water under pressure, a perforated cover, c, and suitable bolts having angular heads, substantially as herein described.

3. A concentrator having a vibratory or oscillating motion, discharge-openings at $e$, the gates $g$, the rods $r$, bell-crank, hand-wheel, spindle, and nut, substantially as and for the purposes herein described.

4. A concentrator having vibratory or oscillating motion, the annular water-space J, the perforated cover $c$, the cone or spider D, rings E, central discharge for tailings, pipes M, chambers $o$, with slits $q$, hopper L, and gutter N, with discharge-openings $e$, substantially as herein described.

In witness whereof we have hereunto subscribed our hands.

JOSHUA E. CLAYTON.
SIMON F. MACKIE.

Witnesses:
THOMAS C. BAILEY,
W. R. MESICK, Jr.